United States Patent [19]

Welsh et al.

[11] Patent Number: 4,955,070

[45] Date of Patent: Sep. 4, 1990

[54] APPARATUS AND METHOD FOR AUTOMATICALLY MONITORING BROADCAST BAND LISTENING HABITS

[75] Inventors: Russell J. Welsh; John D. Fourdraine, both of Toronto, Canada

[73] Assignee: Viewfacts, Inc., Chicago, Ill.

[21] Appl. No.: 212,909

[22] Filed: Jun. 29, 1988

[51] Int. Cl.⁵ ............... H04B 17/00; H04R 29/00
[52] U.S. Cl. .................................... 455/2; 458/67; 458/186; 358/84; 381/58
[58] Field of Search .............. 455/2, 161, 166, 186, 455/67, 9, 18; 379/92; 358/84; 381/56, 58, 80; 369/7

[56] References Cited

U.S. PATENT DOCUMENTS

| | | |
|---|---|---|
| 3,919,479 | 11/1975 | Moon et al. . |
| 4,053,710 | 10/1977 | Advani et al. . |
| 4,060,695 | 11/1977 | Suzuki et al. . |
| 4,230,990 | 10/1980 | Lert, Jr. et al. . |
| 4,388,644 | 6/1983 | Ishman et al. . |
| 4,425,578 | 1/1984 | Haselwood et al. . |
| 4,450,531 | 5/1984 | Kenyon et al. . |
| 4,567,511 | 1/1986 | Smith et al. . |
| 4,584,602 | 4/1986 | Nakagawa . |
| 4,605,958 | 8/1986 | Machnik et al. ................... 358/84 |
| 4,618,995 | 10/1986 | Kemp . |
| 4,626,904 | 12/1986 | Lurie . |
| 4,682,370 | 7/1987 | Matthews . |
| 4,697,209 | 9/1987 | Kiewit et al. . |
| 4,718,106 | 1/1988 | Weinblatt . |
| 4,723,302 | 2/1988 | Fulmer et al. . |
| 4,750,034 | 6/1988 | Lem ........................................ 455/2 |

FOREIGN PATENT DOCUMENTS 2555383 5/1985 France ..................................... 455/2

Primary Examiner—Reinhard J. Eisenzopf
Assistant Examiner—Curtis Kuntz
Attorney, Agent, or Firm—Faegre & Benson

[57] ABSTRACT

An electronic monitor and system for automatically monitoring broadcast band listening habits and periodically collecting data at a central location. The electronic monitor includes a microphone circuit and a tuner circuit. The tuner circuit is tuned until a match is found between the microphone circuit and the tuner circuit and the event of a match is recorded in the portable monitor. Operation may be performed intermittently to extend battery operation. The portable monitor further has power supply monitoring circuits to prevent incorrect data and loss of data in the event of battery discharge. Digitizing and signal processing circuits are provided to perform the match and loss of match determination.

58 Claims, 11 Drawing Sheets

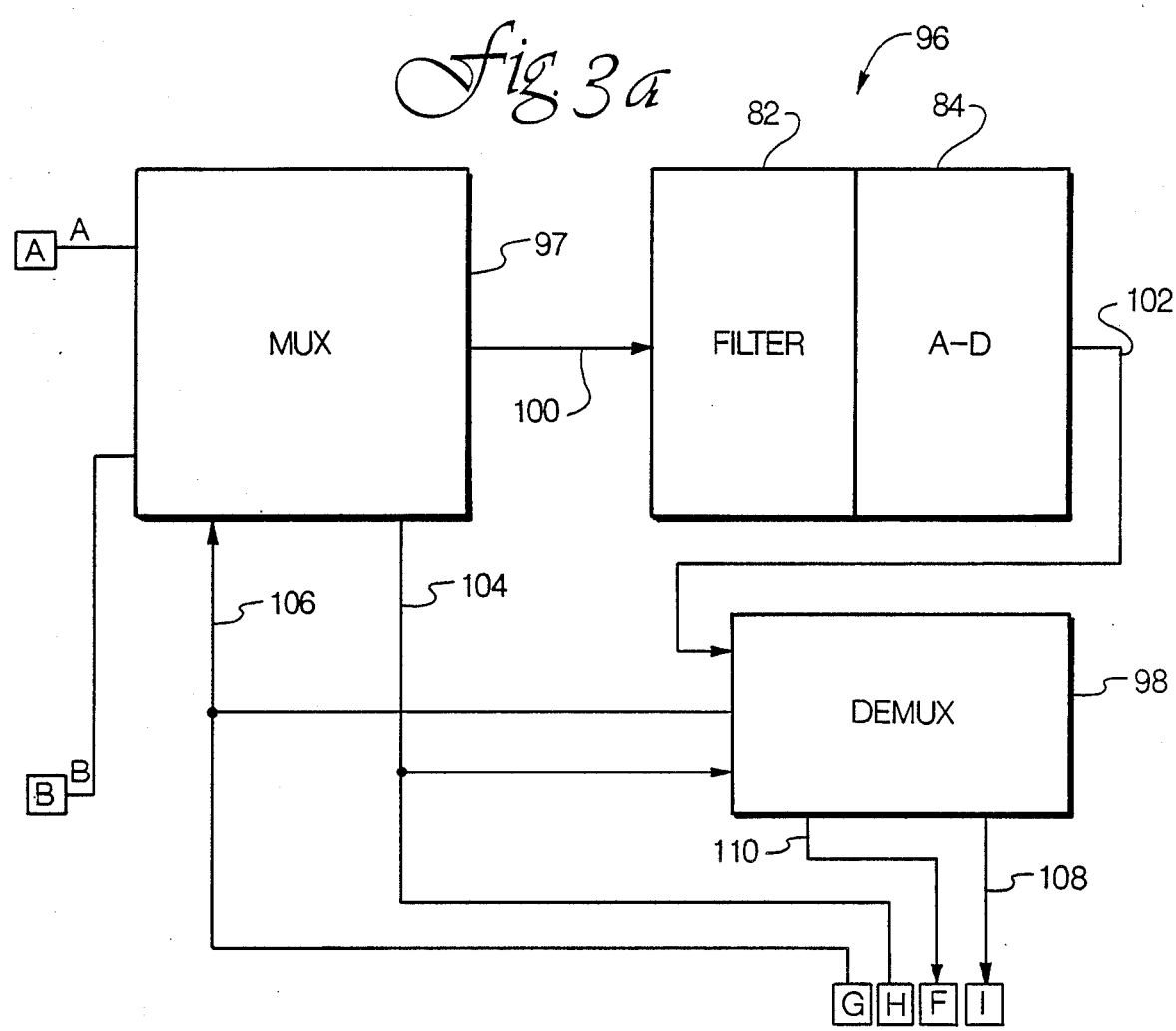

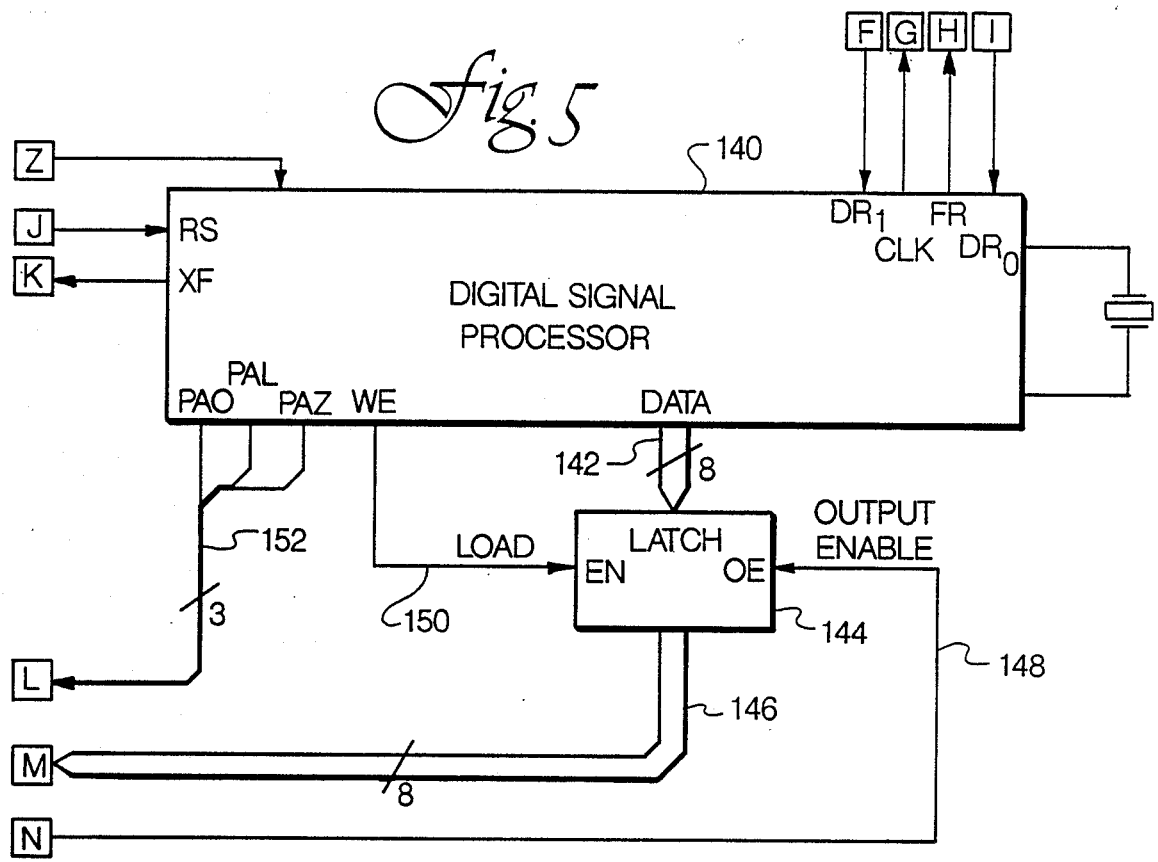
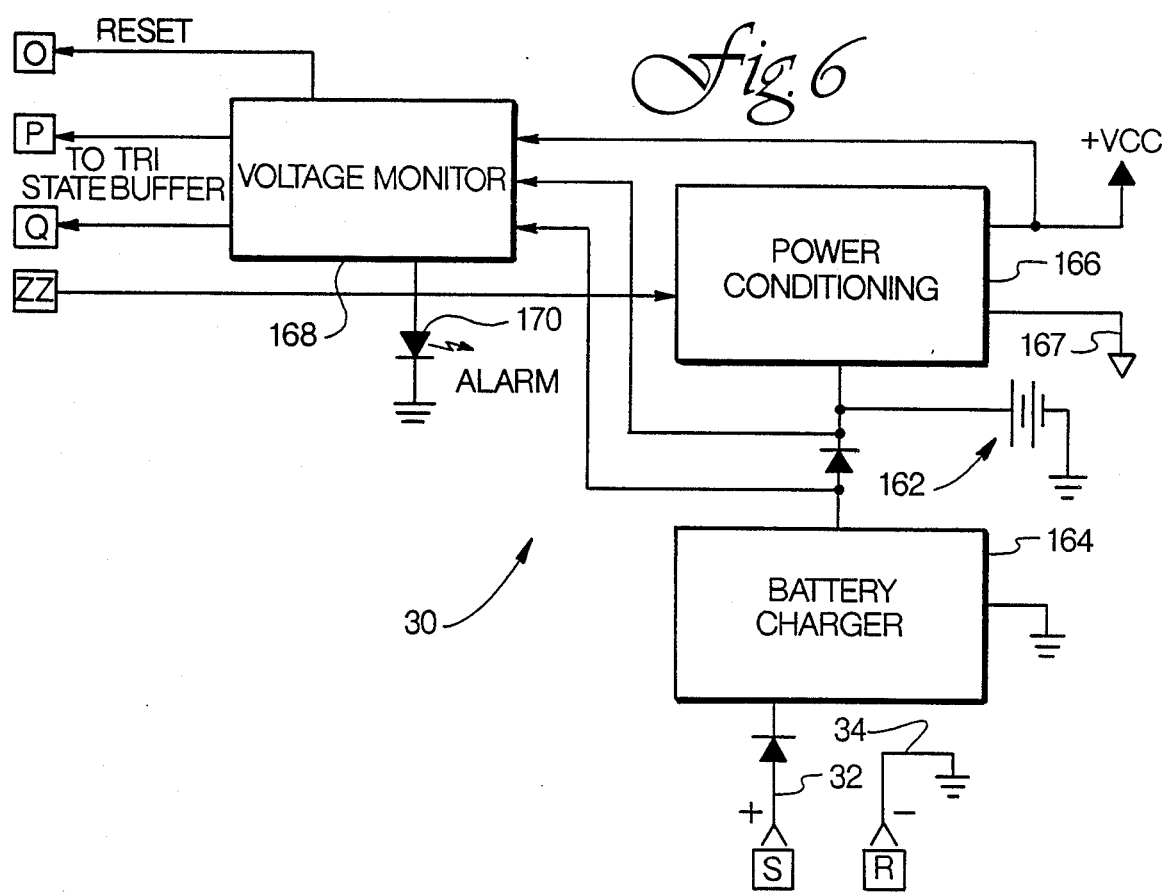

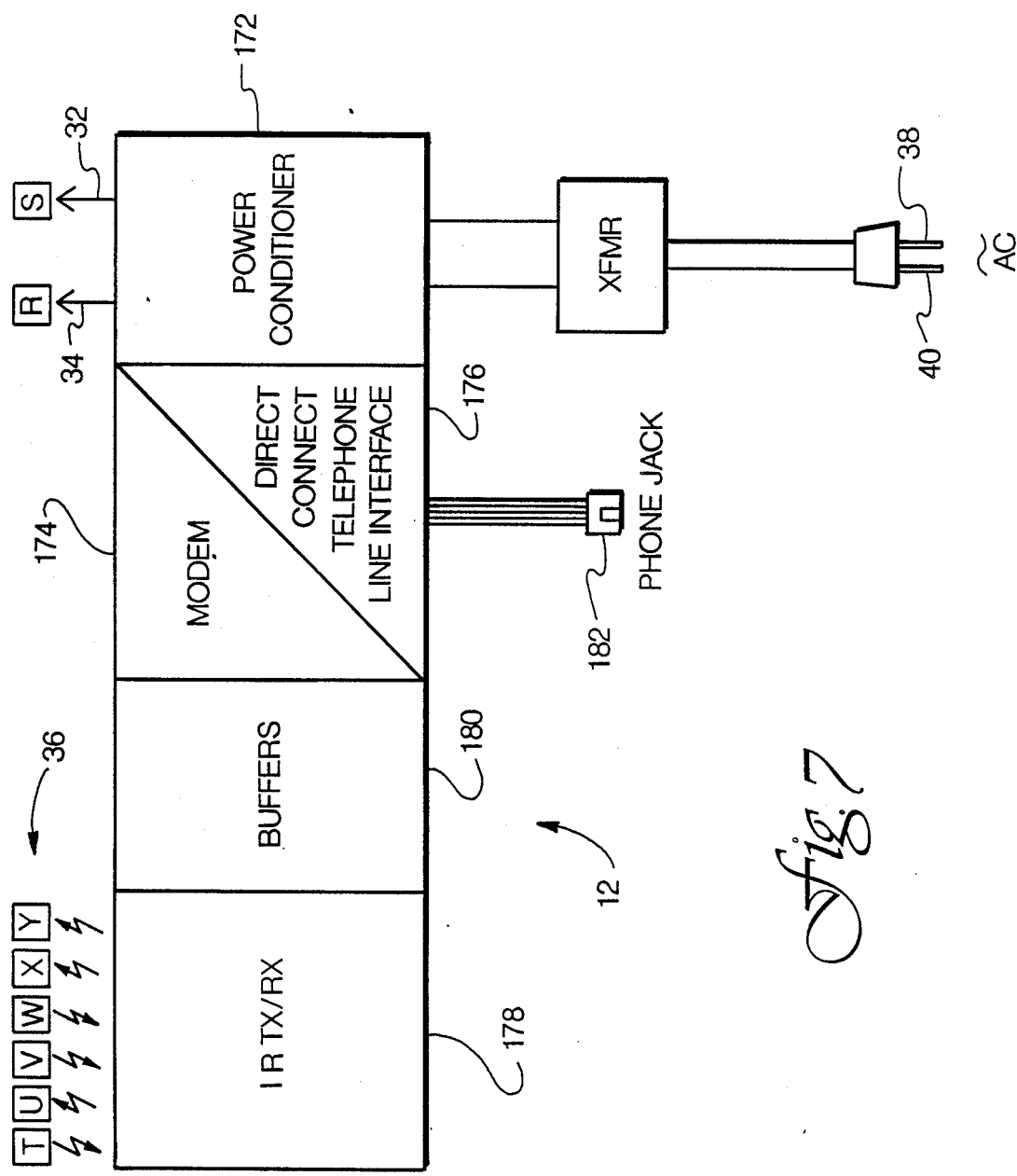

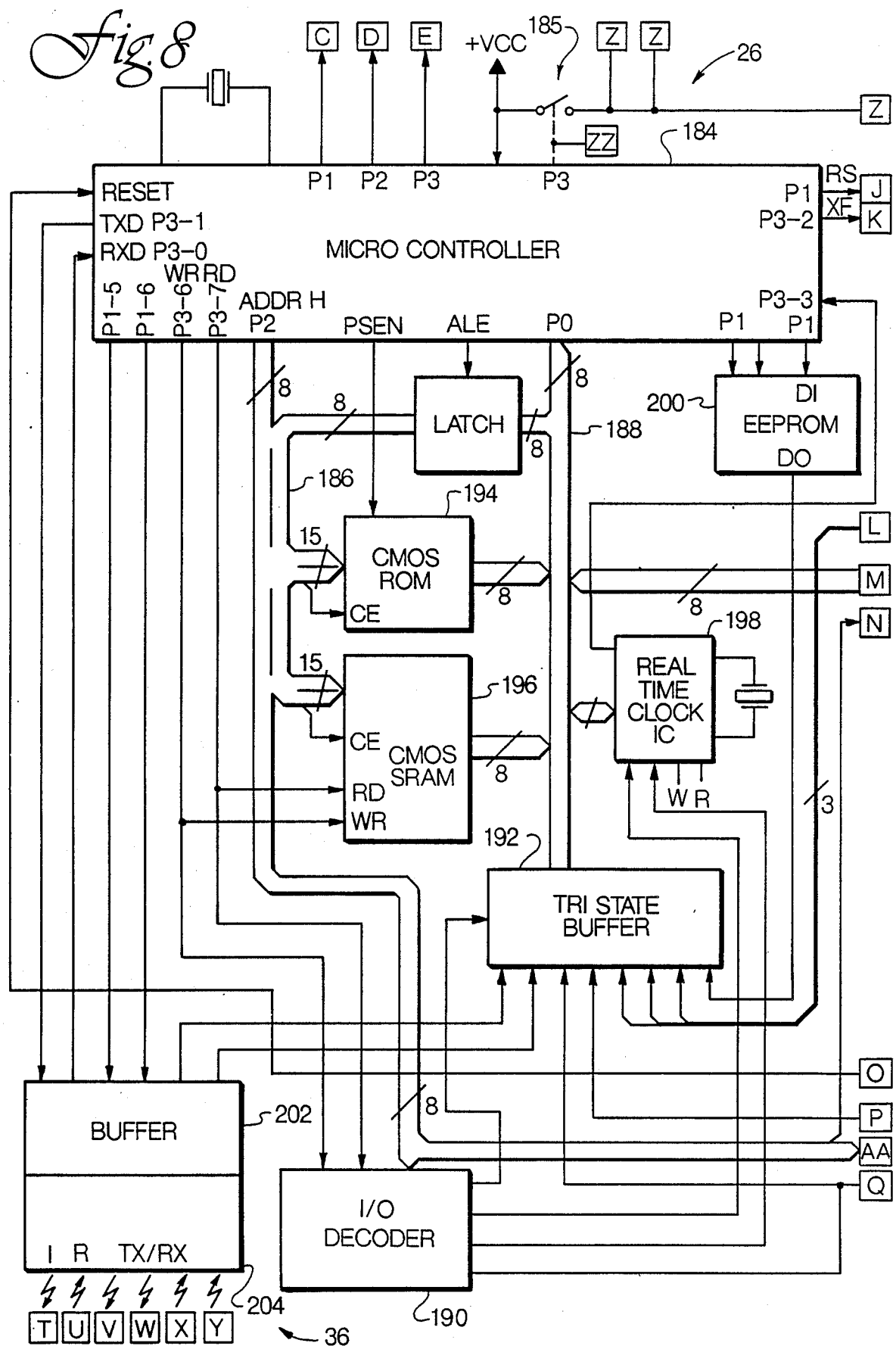

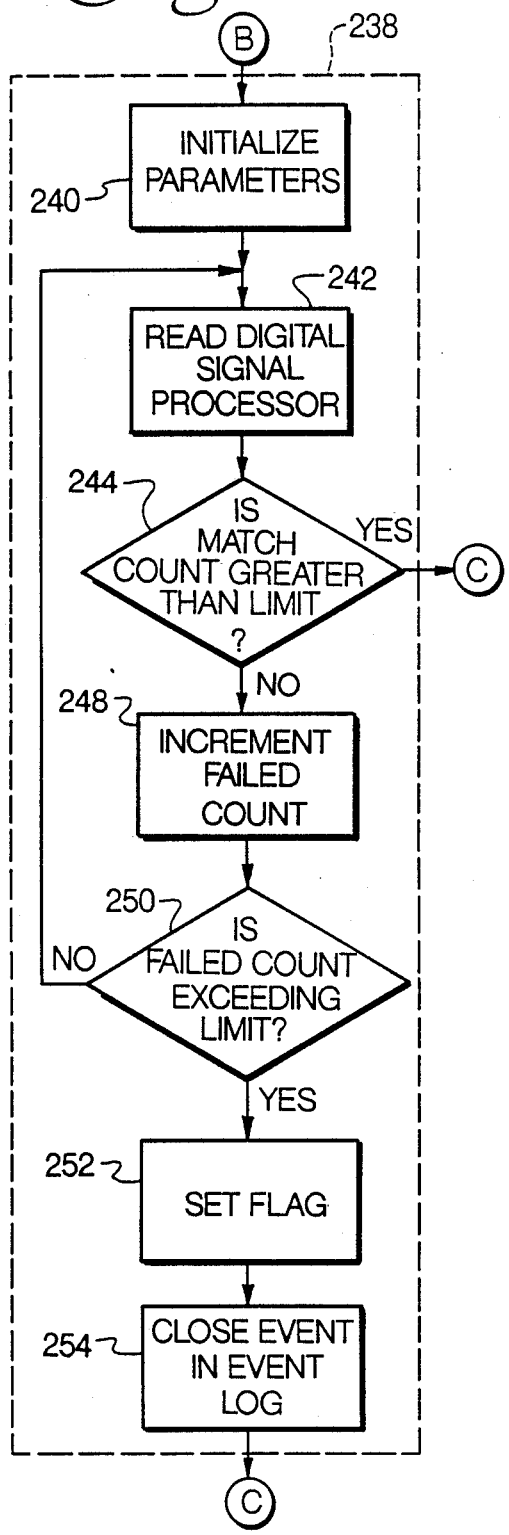
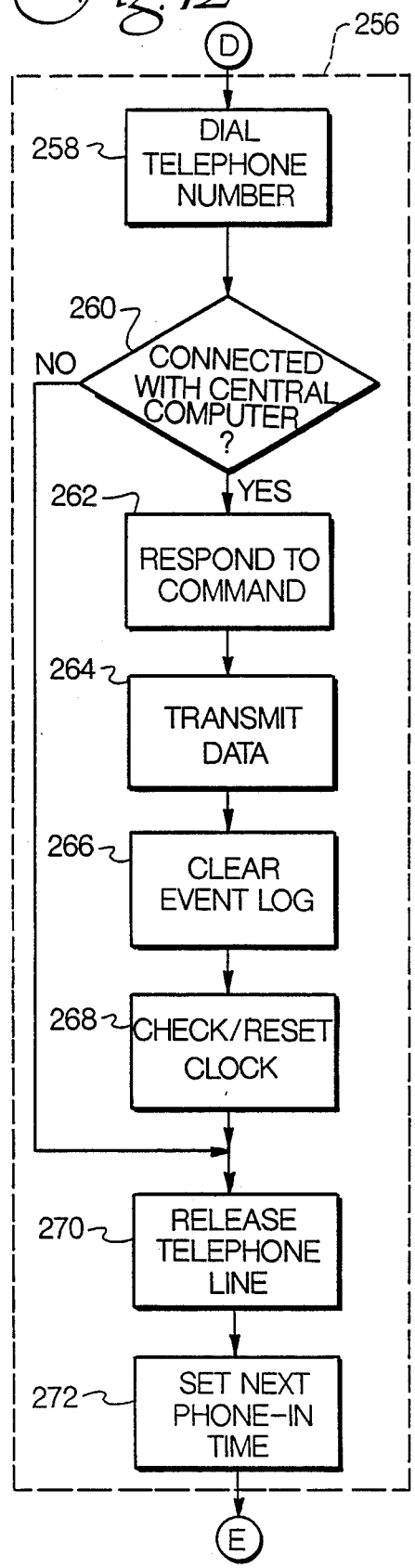

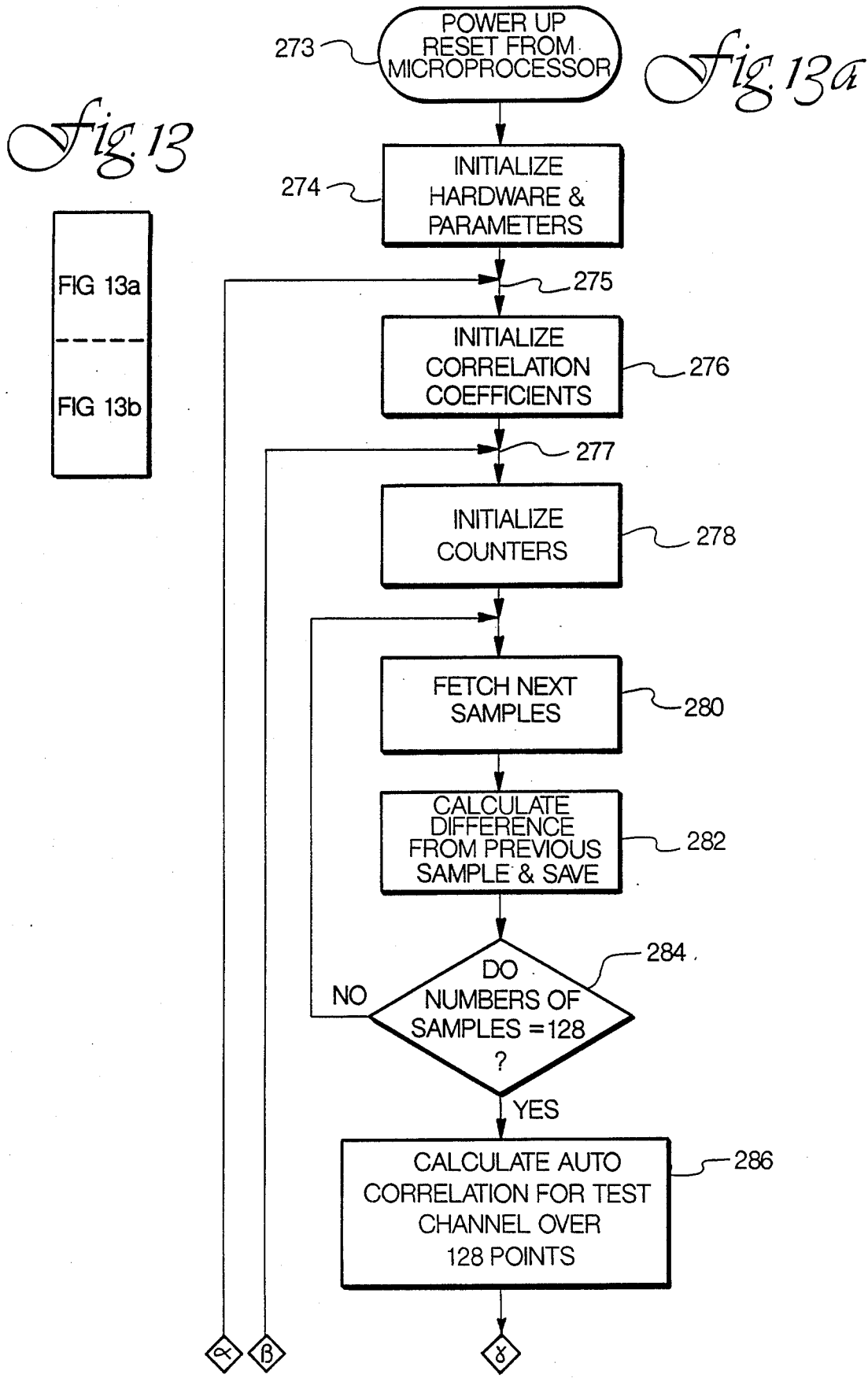

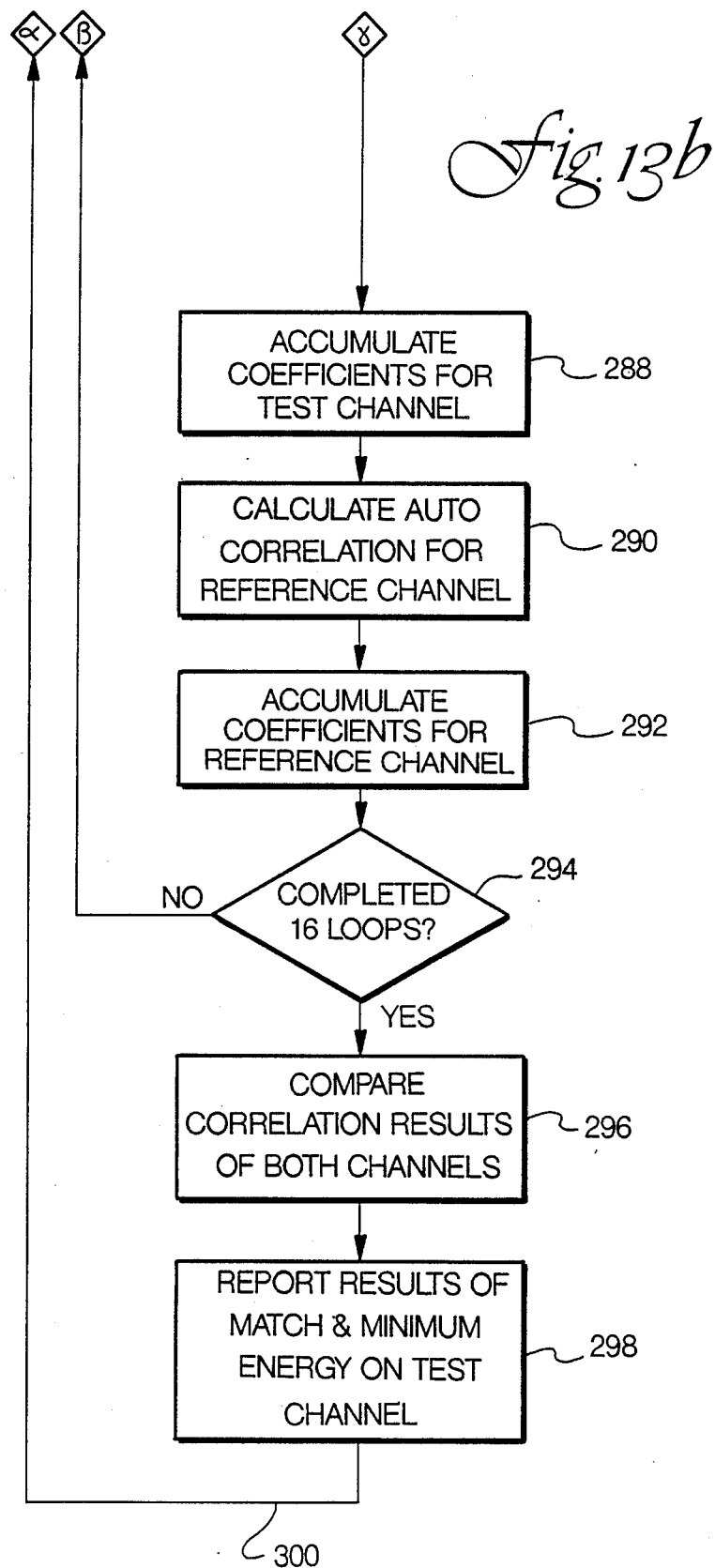

APPARATUS AND METHOD FOR AUTOMATICALLY MONITORING BROADCAST BAND LISTENING HABITS

BACKGROUND OF THE INVENTION

The present invention relates to monitoring systems for accumulating data at a remote location and transmitting the data to a central location. More particularly, the present invention relates to a method and apparatus of automatically monitoring broadcast band listening habits wherein the data collected by such monitoring is transmitted periodically to a central data collection station. In one application, the radio listening habits and preferences of many panelists is monitored, with the data collected and transmitted daily to a central data collection station. Another application is to monitor the TV viewing habits by using the invention disclosed herein to monitor the audio portion of such television viewership.

Prior art systems have relied upon distribution of diaries to random households wherein respondents were asked to report their radio listening habits in the diaries and then return the diaries to the research company. An alternative prior art system required coincidental telephone or in-person interviews to determine which radio or television station the respondent was then currently receiving. A still further prior art system relied upon interviewing consumers to determine which radio station they listened to during the previous day. Each of these are manual systems and have inherent shortcomings. They rely upon the memory and veracity of the participant responding to the survey. Such manual systems also tend to be labor intensive and thus have high operating costs.

More modern, automated systems have been utilized, particularly in television viewership monitoring. Such systems have typically included hardware connection to the television receiver, again resulting in cost and difficulty in installing and operating such surveys.

SUMMARY OF THE INVENTION

The present invention provides for a method and apparatus for automatic monitoring of broadcast band listening habits using an electronic monitor. In one embodiment, the electronic monitor monitors listening habits by acoustically sensing an audio frequency signal within audible range of the electronic monitor, electronically tuning a broadcast band tuner within the electronic monitor until a match is found with the acoustically sensed signal, and recording the time and frequency a match is found in the electronic monitor. The electronic monitor then periodically checks to determine whether a match between the acoustically sensed audio frequency and electronically tuned broadcast frequency is maintained or lost, and electronically records the time when a match is lost.

To conserve power, the electronic tuning and comparing of the signals is performed only when the acoustic signal sensed is greater than a specified threshold level. Furthermore, to speed up the search process, the tuner only looks to broadcast band frequencies then being broadcast in the area in which listening habits are being monitored. As a further refinement, the electronic monitor "memorizes" frequencies listened to at the location being monitored, and looks for a match among that set of frequencies before scanning other frequencies.

The electronic monitor is a portable unit having an internal rechargeable battery power supply preferably capable of operating the monitor for at least 24 hours and is intended to be placed in a base unit having a recharger overnight. During the nighttime hours the internal battery power supply of the monitor is recharged, and the time, date and frequency of each match found is transmitted via a modem in the base unit to a computer at a central data collection station. During this communication, the central data collection station resynchronizes a time of day clock in the portable monitor, if necessary. Once the data is transmitted to the central site, the memory in the portable monitor is erased, making room for the next day's log.

Being portable and free of physical connection to the radio, TV or other device being monitored, such a system has advantages over fixed-location units in that with this invention, portable radio listening habits, particularly automobile radio listening may be monitored and logged.

In the embodiment described above, a microphone or other acoustic sensor or transducer is utilized. In an alternative embodiment, a direct signal input replaces the acoustic sensor and its related electronics to enable the electronic monitor to detect earphone listening.

The present invention relates not only to an electronic device capable of determining which radio or television station a person is listening to but also to the overall system including a number of monitors at individual panelist locations, each of whom have one of these devices. During normal operation, the panelist is expected to carry the portable unit in a pocket or purse. If only automobile radio listening is of interest, the panelist is asked to put the portable unit in the automobile (on the dash or sun visor) in the morning and return it to the base unit at night.

The portable monitor uses a microphone to detect audio frequency acoustic energy within audible range of the panelist. The output of the microphone is digitized by an A/D converter to convert the signal to a digital format. Analog and digital filtering is applied to the signal from the microphone, while the audio sensitivity of the microphone is set to approximate human hearing. Provision has also been made for radio listening by ear-phones through the use of an input jack with a splitter.

The portable monitor also contains a microprocessor controlled tuner whose frequency is determined by a microprocessor in a supervisory control circuit. The audio output of the tuner is also digitized by an A/D converter to convert the signal to a digital format.

The two digitized audio signals are compared to determine if they are equivalent. The algorithms that make this comparison make allowances for the fact that the audio signal received from the microphone will be distorted and contains noise sources not present in the audio signal received directly from the tuner. These distortions may include echoes and time delays and background noise from sources such as conversation, car and road noises and appliances. Therefore, the portable unit will seldom find a perfect match in the two signal sources, but it has been found that a high level of correlation exists when the audio detected by the microphone contains the programme material from the radio station that the internal tuner is receiving.

The algorithm that the portable monitor uses to determine a station match adapts to current conditions in order to conserve battery power and ensure accurate monitoring. The tuner and digitizing electronics are not enabled unless the signal sensed by the microphone exceeds a predetermined threshold. A microprocessor in the control circuit of the monitor is preferably preloaded with the frequencies of the stations that can be received within the area of the panelist and only those stations are selected when a match is being searched for. The control circuit of the monitor also learns which stations are normally listened to by a particular respondent and tries for a match on those "favorite" stations before scanning through all the other receivable stations. Once a station match is made, the microprocessor keeps the tuner on the matching station until a mismatch condition occurs. The microprocessor conserves battery power by testing for a station match on an interrupted or periodic basis.

BRIEF DESCRIPTION OF THE DRAWINGS

FIG. 3a is a block diagram of an alternative embodiment for the digitizer circuit of FIG. 1.

FIG. 5 is a combined schematic and block diagram of an embodiment of a digital signal processor circuit of FIG. 1 useful with the digitizer circuits of FIGS. 3 and 3a.

FIG. 6 is a combined schematic and block diagram of the internal power supply and monitoring circuits of the on-board power supply of FIG. 1.

FIG. 7 is a more detailed block diagram of the base unit of FIG. 1.

FIG. 8 is a combined schematic and block diagram of the control circuit of FIG. 1.

FIG. 11 is a more detailed flow chart illustrating a portion of the flow chart of FIG. 9.

FIG. 12 is a more detailed flow chart illustrating a portion of the flow chart of FIG. 9.

FIG. 13 is a key for FIGS. 13a and 13b.

FIGS. 13a and 13b are a flow chart of the logic of the firmware for the digital signal processor circuit of FIG. 5.

DETAILED DESCRIPTION

Figure 1:
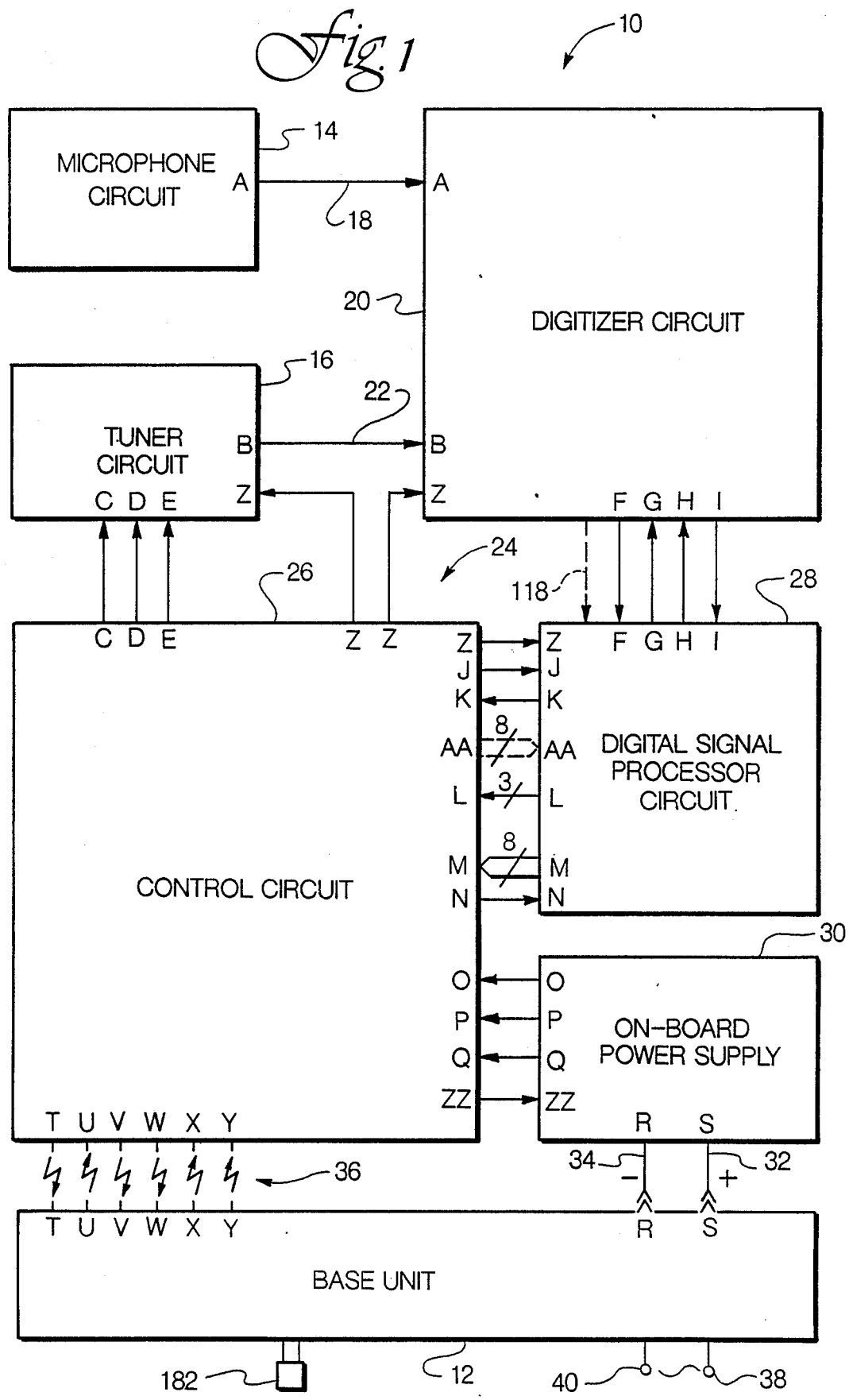
FIG. 1 is a block diagram of the portable electronic monitor and base unit.

Referring now more particularly to FIG. 1, a portable electronic monitor 10 and a base unit 12 may be seen. Monitor 10 has a microphone circuit 14 and a tuner circuit 16. Microphone circuit 14 is connected by line 18 to a digitizer circuit 20. Tuner circuit 16 is connected by a line 22 to digitizer circuit 20.

Monitor 10 also includes a control system 24 comprising a control circuit 26, a digital signal processor circuit 28 and an on-board power supply 30. Monitor 10 preferably interfaces with base unit 12 through direct electrical connections 32, 34 and preferably optoelectronic connections 36. Base unit 12 preferably has a connection to conventional household AC electrical power at terminals 38, 40.

Figure 2:
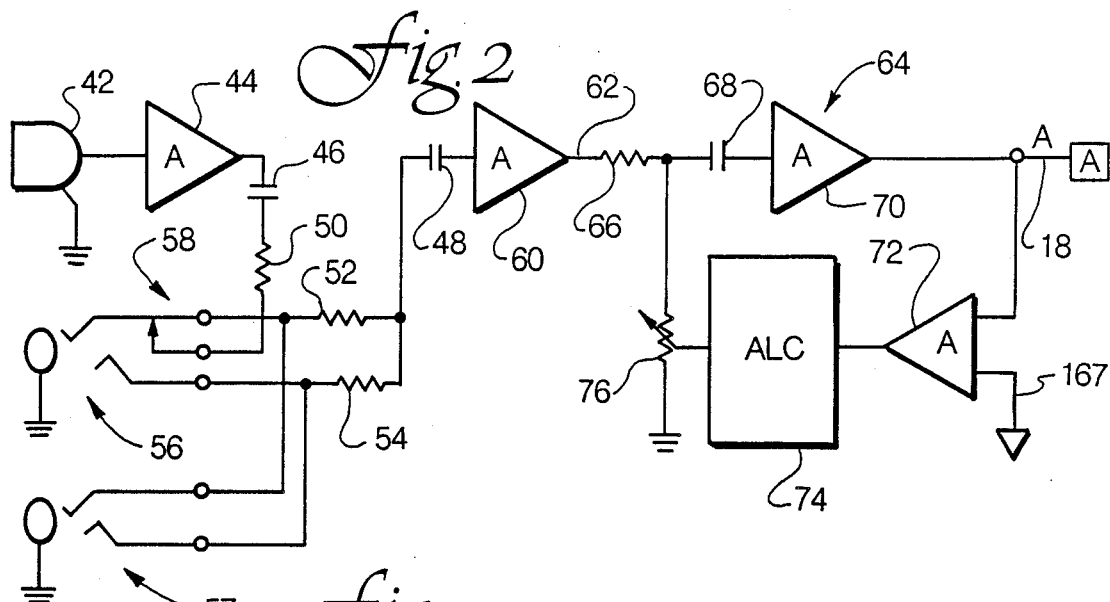
FIG. 2 is a combined schematic and block diagram of the microphone circuit of FIG. 1 with an alternative earphone jack input.
Figure 3:
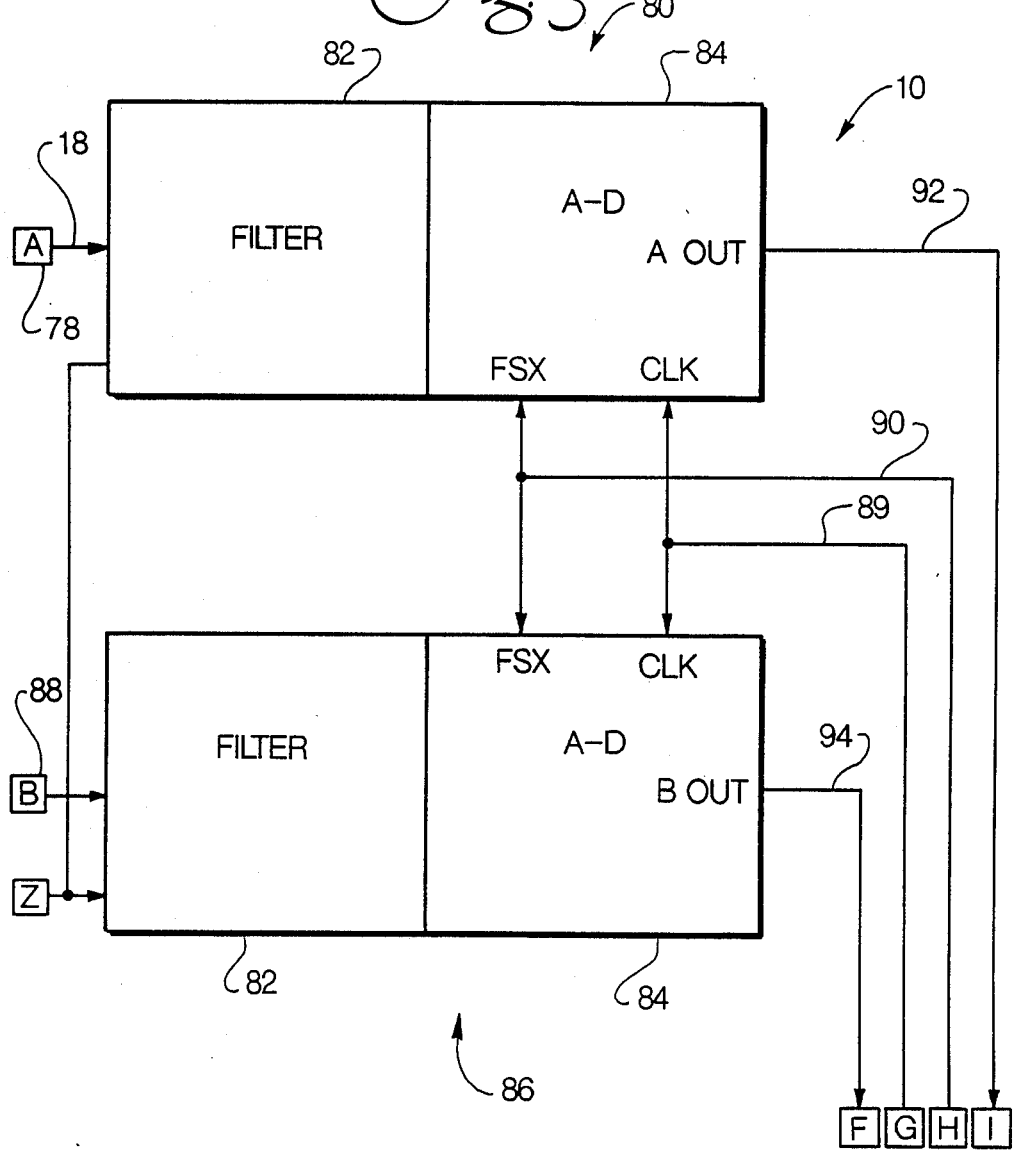
FIG. 3 is a block diagram of one embodiment for the digitizer circuit of FIG. 1.

Referring now more particularly to FIG. 2, the microphone circuit of FIG. 1 may be seen in more detail. A microphone 42 preferably has a relatively flat frequency response from a 300 to 3 K Hertz followed by a fixed gain buffer amplifier 44. The signal from amplifier 44 is coupled by capacitors 46, 48 and scaled by resistors 50, 52 and 54. An alternative input is provided to monitor earphone listening. A stereo line input jack 56 automatically disconnects microphone 42 and amplifier 44 through the action of contacts 58 when a cord (not shown) having a mating plug is connected to jack 56. If a signal is present at the input jack 56, it is mixed to monophonic using resistors 52, 54. An earphone line output jack 57 is connected in parallel with resistors 52, 54 at the output of jack 56 to permit a listener to use stereophonic earphones since the other end of the cord (not shown) will conventionally be plugged into the earphone jack on the radio, TV or other broadcast band device being monitored. Any DC level present on the signal at jack 56 is blocked from reaching the microphone circuit active components by capacitors 46, 48. A second fixed gain amplifier 60 buffers the test signal passing through capacitor 48. The test signal on line 62 is coupled to an automatic level control (ALC) circuit 64. ALC circuit 64 is preferably linear for audio frequencies and will preferably compress the signal level for values above 70 dbA. ALC circuit 64 includes a resistor 66, a capacitor 68, amplifiers 70, 72 and ALC network 74 and a variable resistor 76. Referring now also to FIG. 3, the output from microphone circuit 14 on line 18 is passed as a test signal to a first input 78 of digitizer circuit 10. In the embodiment of FIG. 3, digitizer circuit 10 is preferably comprised of a pair of single chip filter and PCM codec (encoder/ decoder) integrated circuits, as manufactured by Texas Instruments under the model designation TCM29C16. A test channel codec 80 has a band pass filter 82, with a pass band preferably between 300 and 3000 Hertz. Such a pass band will pass midrange audio frequencies, but will prevent aliasing in subsequent digitizing. Codec 80 further includes an A/D converter 84 which will digitize the filtered signal at preferably an 8 KHz sampling rate with an effective accuracy of 12 bits per sample. A second codec 86 receives an input at a second input 88 and passes this signal through an identical filter 82 and A/D converter 84. A clock signal on line 88 and a frame synchronization signal on line 90 control and synchronize the A/D conversions in codecs 80, 86, such that the output from the first or test channel 92 and the output of the second or reference channel 94 represent concurrent samples.

Referring now more particularly to FIG. 3a, in an alternative embodiment, a single codec 96 having a band pass filter 82 and A/D converter 84 may be time-shared through the use of a pre-filter multiplexer 97 and a post-converter demultiplexer 98. In this embodiment, a single channel 100, 102 is time-shared as controlled by control lines 104, 106 such that outputs 108, 110 will contain information corresponding to that on outputs 92, 94 for the prior embodiment.

Figure 3B:
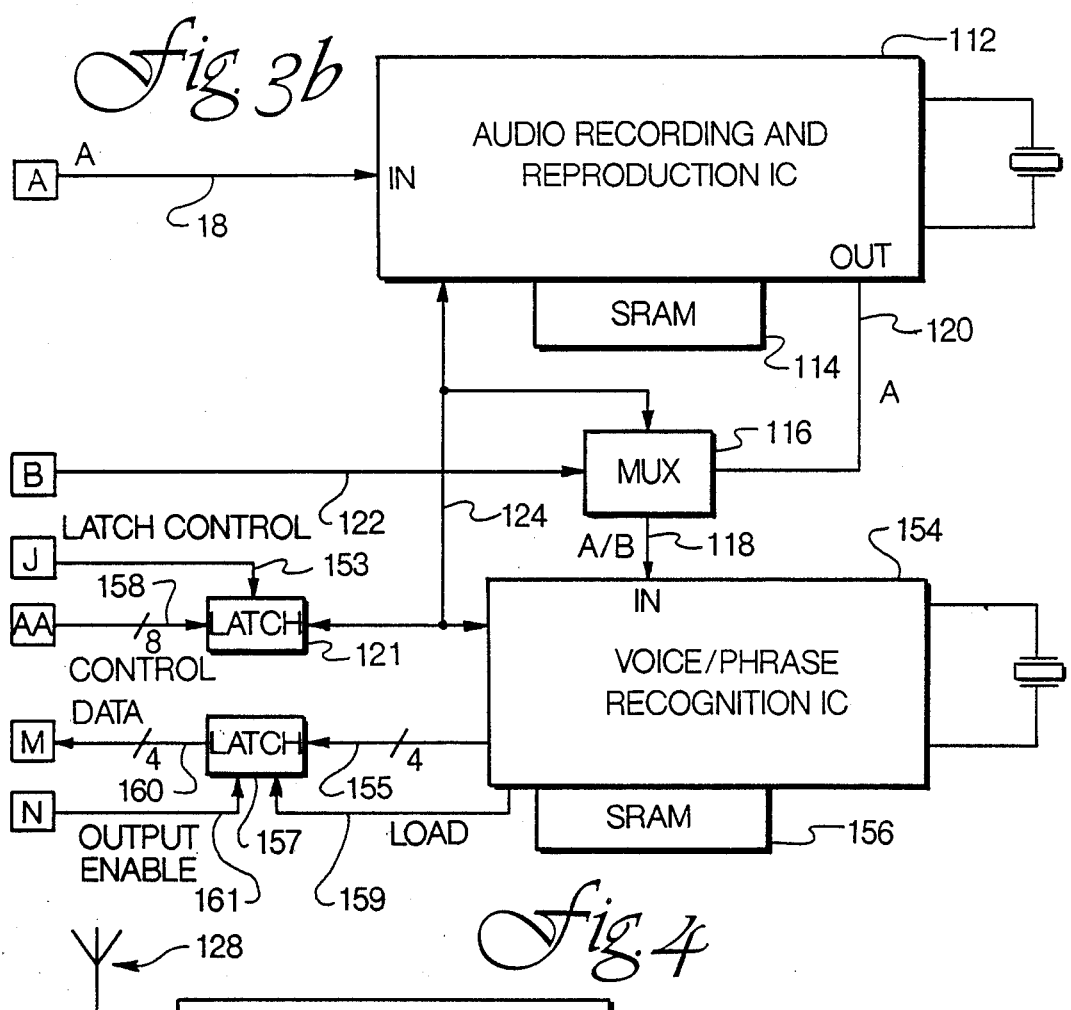
FIG. 3b is a block diagram of a still further alternative embodiment of the digitizer and digital signal processor circuits of FIG. 1.

Referring now more particularly to FIG. 3b, a still further alternative embodiment for a digitizer circuit 10 may be seen. In the embodiment of FIG. 3b, microphone circuit 14 would be connected via line 18 to an audio recording and reproduction integrated circuit (IC) 112. IC 112 is preferably a TC8830F as manufactured by Toshiba. IC 112 may preferably have one or more static random access memory integrated circuits 114 associated therewith. IC 114 is preferably a model TC55257 static random access memory (SRAM) as manufactured by Toshiba. A multiplexer circuit 116 will furnish an output on line 118 corresponding to output 120 from IC 112 or input 122, according to control 124.

Figure 4:
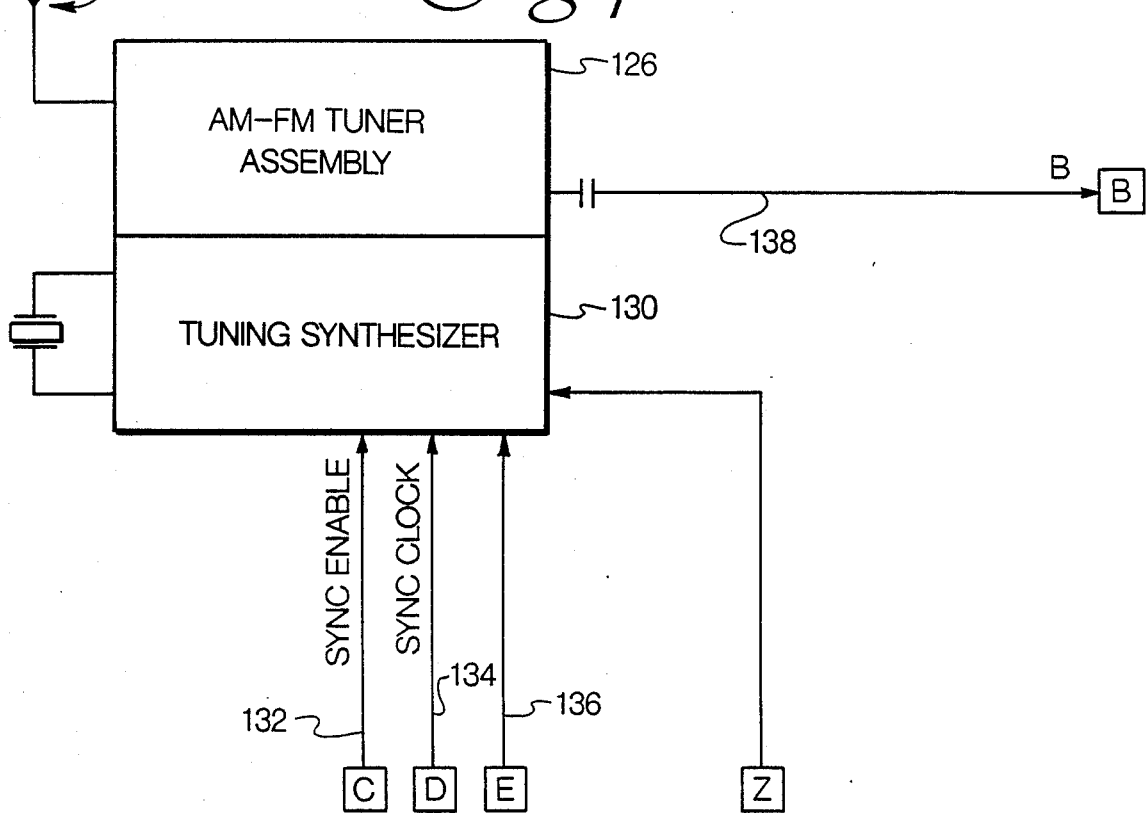
FIG. 4 is a block diagram of the tuner circuit of FIG. 1.

Referring now more particularly to FIG. 4, an electronic tuner, which may be an AM/FM radio tuner, or alternatively, or in addition, may be a television audio tuner 126 receives an input from the antenna 128. A tuning synthesizer 130, which is preferably a model SAA1057 integrated circuit, as manufactured by Signetics Co. Synthesizer 130 receives input commands on lines 132, 134 and 136 which cause it to control tuner 126 to operate at a commanded frequency. Preferably the output on line 138 of tuner 136 is held to a constant level by an automatic gain control function in tuner 126.

Referring now also to FIG. 3, tuner output 138 is preferably connected to the second or reference channel input 88 and processed by codec 86. The signal on input 88 is band pass filtered by filter 82 also set to 300 to 3,000 Hertz, and thereafter digitized at an 8 KHz sampling rate by A/D converter 84 which also has an effective accuracy of 12 bits per sample.

Referring now also to FIG. 5, digital signal processor circuit 28 preferably includes a digital signal processor IC 140. IC 140 is preferably a model TCM320C17 digital signal processor IC as manufactured by Texas Instruments. As will be described in more detail hereinafter in connection with the accompanying flow charts of FIGS. 13a and 13b, IC 140 receives the output of codecs 80, 86 on lines 92 and 94 and calculates a set of autocorrelation coefficients for each of these channels, compares these autocorrelation coefficients and determines whether a match has occurred between the first and second channels, i.e., between the signal sensed by the microphone circuit 14 and that sensed or received by tuner circuit 16. Digital signal processor 140 preferably has 4 K words of programme memory and 256 words of data memory and provides an output on data lines 142 which is retained by latch 144 and indicates whether or not a match has been found and also indicates whether or not each of the two channels has exceeded a minimum energy threshold. The output of latch 144 is presented on data lines 146 when latch 144 is enabled on OUTPUT ENABLE line 148. Digital signal processor 140 updates data in latch 144 through a LOAD command on line 150. Integrated circuit 140 has a three-bit wide I/O port address output bus 152 connected to control circuit 26 for system operation in combination with the data on lines 146.

Referring now more particular to FIG. 3b, an alternative embodiment for digital signal processor circuit 28 may include a voice/phrase recognition IC 154. IC 154 is preferably a model T6658A integrated circuit as manufactured by Toshiba. IC 154 may have one or more SRAM IC's 156 associated with it. SRAM 156 is preferably formed of one or more model TC5514 or TC5516 memory chips as manufactured by Toshiba. IC 154 will alternately receive representations of the signals on lines 18 and 122 via line 118 under the control of line 124, and will compare the signal on line 122 with a time shifted representation of the signal on line 18 as presented on line 120 in order to determine if a match has been found. The presence or absence of a match found by IC 154 will be indicated on DATA lines 155. Latch 157 (which corresponds to latch 144 in the embodiment of FIG. 5) will receive and hold DATA when commanded by LOAD line 159. It is to be understood that when the embodiment of FIG. 3b is used, control circuit 26 may utilize an 8-bit wide CONTROL bus 158. Bus 158 is held by latch 121 under control of LATCH CONTROL line 153. Control lines 124 may be single or multi-bit as needed for IC's 112, 116 and 154. The output from IC 154 on line 155 is held by latch 157 for transmission to control circuit 26 on line 160. In addition, the DATA bus 160 may be a four-bit wide configuration in this embodiment. OUTPUT ENABLE line 161 switches tri-state latch 157 from a high impedance state to a state presenting the output of IC 154 when commanded by control circuit 26.

Referring now to FIG. 6, on-board power supply 30 is seen to include a rechargeable battery 162 which is recharged by charger circuit 164 when power is supplied to terminals 32, 34. Battery 162 may be a 6 V, 1 ampere-hour type NP1-6 as manufactured by Yuasa. Various levels of voltage are furnished to circuitry as needed by a power conditioning circuit 166. A voltage monitor circuit 168 monitors the voltage of battery 162 to detect when battery power becomes low. Voltage monitor 168 may utilize a type TL7705 integrated circuit as manufactured by Texas Instruments. LED 170 is flashed at that time to prompt the user to return monitor 10 to base unit 12 for recharging.

Referring now also to FIG. 7, base unit 10 includes a power conditioner section 172 to furnish the appropriate power at terminals 32, 34. Base unit 12 further has a Bell-type 212 modem section 174 which preferably supports full duplex communication at 1200 baud and includes a dial out capability through a direct connect telephone line interface section 176. Modem section 174 may include an STC 9492C1D type modem as manufactured by SMOS. Base unit 12 also preferably further has an infrared transmit/receive section 178 to transmit and receive data via optoelectronic link 36. Base unit 12 may further have a buffer section 180 to temporarily hold data being passed between section 178 and 174 or vice versa. A conventional phone jack 182 may be used to provide connection to the telephone line interface section 176.

At night the radio meter or monitor 10 is to be placed in a cradle in base unit 12. Electrical connection is made between monitor 10 and base unit 12 through mechanical contact at terminals 32, 34.

Referring now to FIG. 8, control circuit system 26 may be seen in more detail. In the embodiment shown, circuit 26 has a model 80C31 microcontroller or microcomputer 184 as manufactured by Intel Corporation. Microcontroller 184 has a 16-bit wide multiplexed data-/address bus 186 and an 8-bit wide data bus 188. Digital signal processor circuit 28 is interfaced to microcontroller or microprocessor 184 via the address bus 186 and data bus 188 through an I/O decoder 190 (such as a pair of type 74HC139 decoder ICs as manufactured by Texas Instruments and a tri-state buffer 192 (such as a 74HC244 as manufactured by Texas Instruments). Control circuit 26 also includes a 32 K×8 ROM 194 (which may be a Texas Instruments type P27256A), a 32 K×8 RAM 196 (which may be a Toshiba type TC 5565PL15), a real-time clock IC 198 (such as, for example, a type ICM7170 as manufactured by Intersil) and a 128 byte or larger EEPROM IC 200 (such as a type HY93C46 as manufactured by Hyundai). Control circuit 26 also includes address decoding electronics (not specifically shown) and interface buffer 202 for the infrared transmit/receive electronics 204 for the optoelectronic connections 36. An octal latch (for example, a type 94HC373 as manufactured by Texas Instruments) is used by microcontroller 184 in connection with busses 186 and 188. Real-time clock 198 maintains an accurate time-of-day reference in control circuit 26. RAM 196 is used by microcontroller 184 to store collected data and also for general system usage. Firmware for microprocessor 184 is resident in ROM 194. EEPROM 200 is used to retain device-specific parameters such as the individual unit identification number, central site telephone numbers, call-in times, and a list of "favorite" radio stations and any other information intended to survive discharge of the battery in the on-board power supply 30.

Power to the tuner circuit 16, the digitizer circuit 10, the digital signal processor circuit 28 and the −5 V part 167 of the power supply 30 can be switched off by microprocessor 184 through electronically controlled switch 185. Shutting off power to these circuits will conserve the power of battery 162. It is to be understood that switch 185 is preferably one or more solid state devices and may be located in power supply 30 instead of control circuit 26.

Referring now more particularly to FIGS. 9-12, on initial power up, microprocessor 184 resets at block 206 and initializes system parameters at block 208. Operation then enters the main loop where signals received at the test input of microphone circuit 14 are monitored to determine if a match is active at block 210, connection to the base unit is checked at block 212 and power is conserved in block 214 if necessary, and finally the real-time clock 198 is checked at block 216 to see if it is time to call in to the central data collection station. The period that power is switched off by switch 185 is a function of whether a channel match is active and is a variable that can be changed by the central computer.

Figure 10:
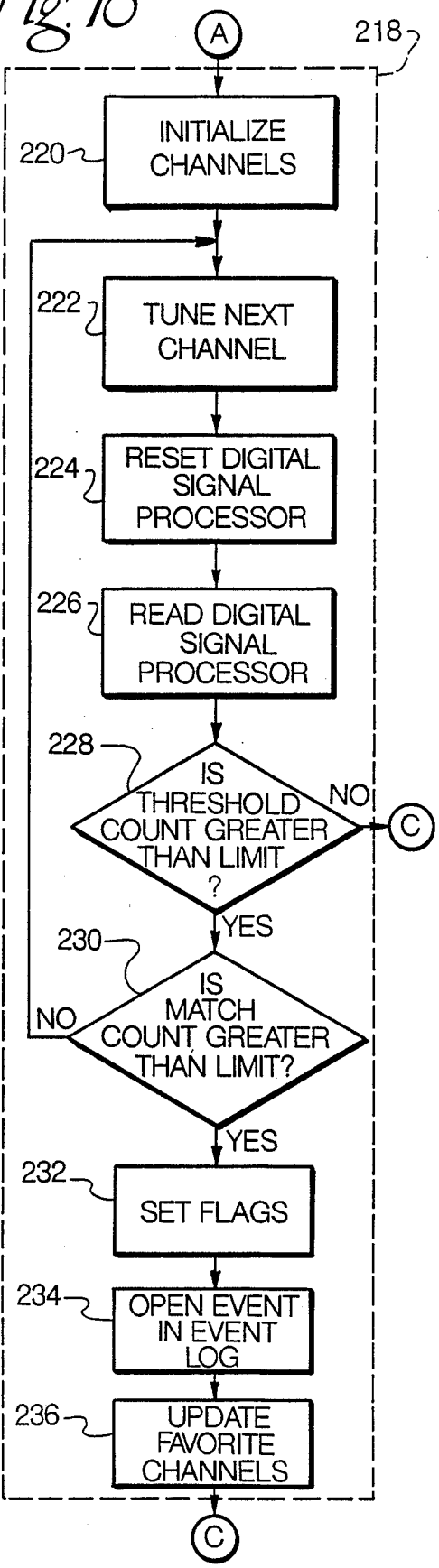
FIG. 10 is a more detailed flow chart illustrating a portion of the flow chart of FIG. 9.

If a match is not active, a hunt for a channel commences as indicated by block 218. The internal details of block 218 are shown in FIG. 10. At block 220, monitor 10 initializes the control variables for this sequence of code. At block 222, tuner circuit 16 is tuned to the next radio channel to be tested and digital signal processor circuit 28 is reset in block 224. In block 226, the control circuit 26 receives the results of the attempted channel match from digital signal processor circuit 28. Two parameters are returned to control circuit 26 by the digital signal processor circuit 28. The first parameter is tested in block 228 to determine the amount of energy or signal strength received on each of the microphone and tuner circuit channels 14, 16. The second parameter is tested in block 230 to determine whether a match exists between the first and second channel. The match count determined by block 230 indicates the magnitude of the correlation between the first and second channel.

Figure 9:
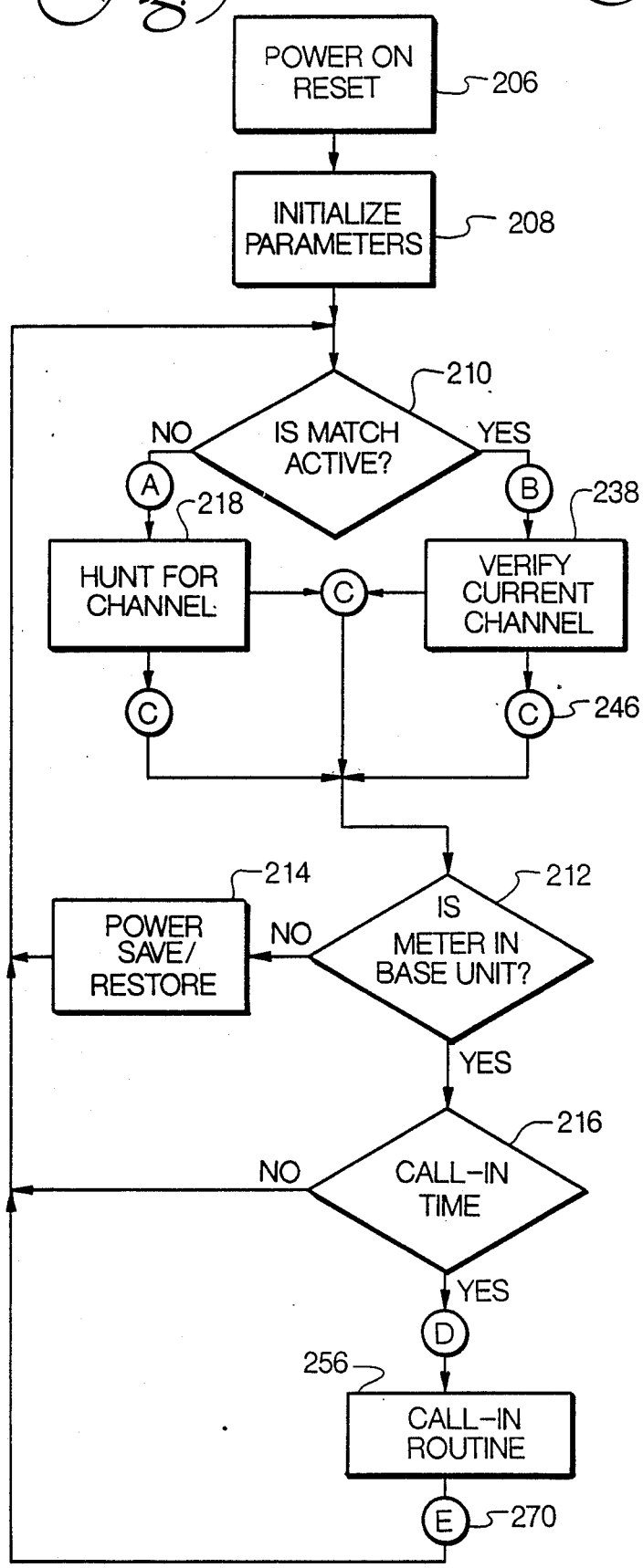
FIG. 9 is a flow chart illustrating the operation of this invention.

In block 228 the test channel is compared to a limit or threshold and if the limit is not exceeded, it indicates that no meaningful audio signal is present and control is returned to point C 246 in the main flow path of FIG. 9. If the limit or threshold is exceeded in the test of block 228, the match count or correlation between the two channels is tested in block 230, and if the match count is less than the limit, it indicates that there was not sufficient correlation between the two signals to qualify as a match. Control circuit 26 then tunes to the next channel, as shown in block 222 to check for a match at another frequency. If the match count is exceeded in block 230, control proceeds to block 232 where internal software flags are set, and to block 234 where a match event is opened in a data event log and the list of favorite channels is updated at block 236. Microprocessor 184 maintains and updates a list of favorite radio channels each time a match is found. When the control circuit 26 is searching for a match, it tries a different radio channel each time through the flow path of FIG. 10. The list of favorite channels is searched first, and thereafter all the channels in the AM and FM radio bands (or other broadcast bands of interest) are searched if no match is found with a channel from the favorite list, kept in EEPROM 200.

Referring now to both FIGS. 9 and 11, if the decision in block 210 is that a match is active or open, COntrol circuit 26 will verify that there is still a match with the current channel at block 238. At block 240, microcontroller 184 initializes controlling parameters. Since the channel being received by the tuner circuit 16 has not been changed since the channel match was first found, microcomputer 184 interrogates the digital signal processor circuit 28 for current status information at block 242. At block 244, the values of the parameters returned by the digital signal processor circuit 28 to control circuit 26 are compared to threshold or limit values, and if the threshold values are exceeded by the returned parameter values, the match count is greater than the limit indicating that a match continues to be found. In such a circumstance, control is returned to the main flow path in FIG. 9 at input C 246 of the main flow path of FIG. 9.

If a match no longer exists, as evidenced by the match count being less than the threshold value, which may be due to either too low a level of a signal in either the microphone or tuner paths, or due to a lack of correlation between the signals in those two paths. A failure counter is incremented in block 248. The failure counter is tested in block 250 to see if the failure counter exceeds a threshold or limit value. If the failure counter does not exceed the limit value, the steps of blocks 242-250 are repeated. The threshold or limit value of the failure counter set in block 250 is preferably set high enough to ensure that transient noises picked up by the microphone (or temporary interference picked up by the tuner circuit 16) do not cause control circuit 26 to interpret such interference as a true mismatch or loss of match condition. When the failure counter exceeds the limit in block 250, microprocessor 184 sets software flags to indicate that a channel match is no longer active in block 252 and the "open match" event is closed in the data event log in block 254. Control is then returned to point C 246 in the main flow path of FIG. 9.

Referring now to FIG. 12, the details of block 256 (in FIG. 9) may be seen. In block 258 microprocessor 184 recovers the central data collection station telephone number from EEPROM 200 and instructs modem 174 through optoelectronic link 36 to dial the telephone number of the central computer. In block 260 control circuit 26 determines whether a connection has been established with the central computer. If so, the central computer will send a sequence of commands to the monitor or meter 10 in block 262, causing the control circuit 26 of meter 10 to transmit collected data as indicated by block 264. Once the data has been sent to the central data collection station, the event log in the monitor 10 will be cleared in block 266, the time of day clock will be checked and reset if necessary in block 268. Local run-time variables will also be set in block 268. At block 270 the telephone line is released. At block 272 the next phone-in time is set, and may be made dependent upon whether or not monitor 10 made connection with the central data collection station. If no contact was made as evidenced by the result of block 260, an alternate phone-in time may be set in block 272. Normally, when the attempted call is successful, the next call-in time is set for the same time next day. After setting the next call-in time in block 272, control circuit 26 returns to the main flow path at point E 270 of FIG. 9.

Referring now more particularly to FIGS. 13a and 13b, a flow chart for firmware in the digital signal processor circuit 28 may be seen. When power is first applied, block 273 will initialize digital signal processor 140 and latch 144. Initialization may also occur under control of microprocessor 184 if desired. At block 274, all internal software parameters are initialized and hardware control of the digitizer circuit 20 is initialized. In the embodiment of FIG. 3, this means that codecs 80 and 86 are initialized. Signals are preferably digitized at a rate of 8 K samples per second so that a new signal from each signal channel is produced every 125 microseconds. At block 276, software resident in the digital signal processor 140 which calculates correlation coefficients is initialized. At block 278 loop counters are initialized. Blocks 280 and 282 represent the inner loop of digital signal processor firmware. In this loop, samples are obtained from the digitizer circuit 20, which in the embodiment of FIG. 3 includes codecs 80 and 86. Differences between successive samples are calculated and saved for each channel in block 282. Block 284 tests one inner loop counter to determine if the number of samples equals 128. After 128 sample points have been collected (which for the example sample rate will take 16 milliseconds) digital signal processor 140 calculates the autocorrelation function for the test channel in block 286. It is to be understood that the set of 128 samples make up a form of template or spectrogram for the signal being analyzed. In block 288 the correlation coefficients for the test channel are accumulated. In block 290 autocorrelation for the reference channel is calculated and the reference channel coefficients are accumulated in block 292. Although these blocks are shown sequentially, calculations on reference and test channels proceed in parallel in this implementation. It is to be understood that the Leroux-Gueguen recursion computation (IEEE Transactions on Acoustics, Speech, and Signal Processing, June 1977, pp. 257-259) may be utilized by the digital signal processor circuit 28 when a TMS320C17 integrated circuit is used to perform the steps of FIGS. 13a and 13b. A second loop counter is tested at block 294 to determine if the correlation coefficients have been accumulated 16 times. If not, digital signal processor 140 returns to input 277 of block 278 and the process is repeated until correlation coefficients have been accumulated 16 times. The digital signal processor 140 will then have processed 256 milliseconds of data. This has been found sufficient to determine if a match exists. At block 296 a comparison of the autocorrelation results from each channel is made to determine if a match has been found. In the practice of this invention, the signal matching is accomplished by comparing the spectrograms or templates from each of the two input channels. A sufficient degree of correlation between the templates will indicate that a match has been found between the channels. Similarly, when the correlation between the channel templates falls below a predetermined threshold, such a result will indicate that a match has been lost. This result may be due to either a true loss, or a transient interference on either of the channels. Block 250 (in FIG. 11) prevents a false loss of match result. Digital signal processor circuit 28 also determines if a minimum energy threshold has been achieved on each of the two signal channels. At block 298, the results of the digital signal processor computations are reported to control circuit 26. Digital signal processor 140 returns via loop 300 to input 275 of block 276 and continues to repeat until stopped or reset by the control circuit 26.

It may thus be seen that a method for practicing this invention is to automatically monitor broadcast band listening habits using an electronic monitor by acoustically sensing an audio frequency signal within audible range of the electronic monitor; electronically tuning a broadcast band tuner in the electronic monitor until a match is found with the acoustically sensed signal; and recording in the electronic monitor the time and broadcast frequency at which a match is found and at which the match is later lost. To avoid false indications of loss of a match, the time a match is lost is recorded only after a match is lost for more than a predetermined time. The tuner may be tuned only to broadcast band frequencies then being broadcast in an area in which listening habits are being monitored. The sensing and tuning may be continuously, intermittently or periodically performed. Alternatively the sensing and tuning may be continuously performed until a match is found and thereafter periodically performed until the match is lost. As another alternative, the tuning may be performed only when the sensing detects a signal exceeding a threshold level. The broadcast frequency and date on which the match is found may be recorded along with the time a match is found as recorded or logged data and a running check-sum of the logged data may be updated and recorded to serve as an audit trail for the logged data.

As a still further alternative, the sensing and tuning may be intermittently performed at a first rate until a match is found and thereafter intermittently performed at a second rate until the match is lost. The first and second rates may be equal, however, preferably the first rate has a higher frequency than the second rate. For more efficient searching for a match in the practice of this invention, it is preferable to first tune successively to a set of stored frequencies at which a match was previously found and thereafter tune to other frequencies until a match is found. Using this search method, it has also been found preferable to update the set of stored frequencies at which a match was previously found with a frequency at which a new match is found.

The method for practicing this invention may further include transmitting the times, dates and broadcast frequencies recorded in the monitor to a central collecting station, preferably every evening, and then erasing the times, dates and frequencies recorded in the monitor to permit logging of new data in the monitor.

While the monitor is operating, it is electronically sensing an internal power supply level and will discontinue sensing, tuning and recording data when the power supply level falls below a predetermined value; however the electronic monitor retains times, dates and frequencies recorded when the power supply level falls below the predetermined value. Additionally, the monitor will record the occurrences of the internal power supply falling below and rising above the predetermined level, and will check the set of stored frequencies and the running check-sum and an internal time-of-day clock for valid values when the internal power supply rises above the predetermined level. Upon establishing communication with a central station (which preferably occurs daily), the monitor will restore a correct set of stored frequencies and the valid value for the internal time-of-day clock in the event that an invalid value is discovered by the checking.

Stated another way, an apparatus for automatically monitoring broadcast band listening habits according to this invention includes a portable self-powered electronic monitor 10 having sensor means 14 with both i) an input jack means 56 for receiving a line input of broadcast band program material from an earphone jack output of a broadcast band receiver, and ii) a microphone circuit 44, 46, 50 having an audio-frequency-sensitive microphone 42, an automatic level control circuit means 64 for compressing the dynamic range of the output of the microphone circuit for sensing energy in the audio frequency spectrum and providing an output representative thereof, first signal conversion means connected to the sensor means output for providing a first electronic signal representative thereof; electronic tuner means 16 for receiving a selectable broadcast band signal and for providing a second electronic signal representative thereof; control means 26 connected to the tuner means 16 for controlling the tuning of the tuner means by changing the tuning of the tuner means until a match is found between the first and second electronic signals, and recording as data a time and broadcast frequency at which the match is found; and digital signal processing means 28 receiving the first and second electronic signals for comparing the first and second electronic signals to determine whether a match is present between the first and second electronic signals. The digital signal processing means calculates (preferably periodically) at least one and may calculate a plurality of correlation coefficients corresponding to the degree of correlation between the first and second electronic signals.

The first signal conversion means may also include digitizer means 20 for converting the first and second electronic signals into a digital format.

The control means 26 has a real-time clock 198 and is responsive to the first and second electronic signals to hold the monitor 10 in a low power consumption state while one or both of the first and second electronic signals are below respective threshold levels.

Apparatus suitable for the practice of this invention may further include a base unit 12 for the electronic monitor 10, the base unit 12 having means for physically receiving the monitor on the base unit, and means 178 for communicating information to and from said monitor 10 through the base unit 12 when the monitor is received on the base unit, and further includes a telephone interface 176 for transmitting recorded data to a central data collection station via a telephone connection 182. The monitor further preferably has a rechargeable battery 162 with electrical power connection means in the base unit for recharging the battery 162 in the monitor 10.

Referring now more from a systems point of view, this invention is a method of monitoring and logging broadcast audience signal reception by electronically monitoring (either by a microphone circuit or by an audio amplifier circuit directly receiving the audio signal at a headphone jack) an audio frequency spectrum for a broadcast signal reception by a broadcast audience member; electronically setting a tuner successively to broadcast signal radio frequencies each modulated by a respective audio signal; electronically comparing the audio signals of monitoring and setting the tuner until a match is found; and electronically logging as recorded data a date, time of day, and radio frequency at which a match is found. The electronic monitoring and logging is performed by a portable electronic monitor having an internal rechargeable power supply which is periodically coupled to a base unit for recharging. When the portable monitor is coupled to the base unit, the recorded data is communicated to a central data collection station through the base unit. In the process of comparing the audio signals, it has been found preferable to digitize the audio signals (either concurrently or alternately) and compare the digitized signals. In either event, the digitized signals are compared by electronically computing correlation coefficients, more particularly by comparing spectrograms or templates formed as a result of the steps of autocorrelating a signal resulting from electronic monitoring of broadcast signal reception by an audience member and autocorrelating a signal resulting from electronically setting a tuner to successively to audio modulated broadcast signal radio frequencies. It is to be understood that the auto correlating of each signal occurs before comparing them.

The invention is not to be taken as limited to all of the details thereof as modifications and variations thereof may be made without departing from the spirit or scope of the invention.

We claim:

1. A method of automatically monitoring broadcast band listening habits using an electronic monitor and comprising the steps of:
    (a) acoustically sensing an audio frequency signal free of an injected identification signal within suitable range of the electronic monitor;
    (b) electronically tuning a broadcast band tuner in the electronic monitor to sense the audio frequency content of an output signal of the tuner;
    (c) autocorrelating each of the signals sensed in steps (a) and (b) to obtain a set of correlation coefficients for each signal;
    (d) detecting a match between the acoustically sensed signal and the tuner output signal by comparing the sets of correlation coefficients obtained in step (c); and
    (e) recording in the electronic monitor the time a match is found.

2. The method of claim 1 wherein step (b) further comprises tuning said tuner only to broadcast band frequencies then being broadcast in an area in which listening habits are being monitored.

3. The method of claim 1 wherein steps (a) and (b) are continuously performed.

4. The method of claim 1 wherein steps (a) and (b) are intermittently performed.

5. The method of claim 1 wherein steps (a) and (b) are periodically performed.

6. The method of claim 1 wherein steps (a) and (b) are continuously performed until a match is found and thereafter periodically performed until the match is lost.

7. The method of claim 1 wherein step (b) is performed only when the signal sensed in step (a) exceeds a threshold level.

8. The method of claim 1 wherein step (c) further comprises recording the broadcast frequency at which the match is found.

9. The method of claim 8 wherein step (c) further comprises recording the date upon which a match is found.

10. The method of claim 8 further comprising updating and recording a running check-sum of the logged data.

11. The method of claim 1 wherein steps (a) and (b) are intermittently performed at a first rate until a match is found and thereafter intermittently performed at a second rate until the match is lost.

12. The method of claim 11 wherein the first and second rates are equal.

13. The method of claim 11 wherein the first rate has a higher frequency than the second rate.

14. The method of claim 12 wherein step (b) further comprises first tuning successively to a set of stored frequencies at which a match was previously found and thereafter tuning to other frequencies until a match is found.

15. The method of claim 14 further comprising updating the set of stored frequencies at which a match was previously found with a frequency at which a match is found.

16. The method of claim 1 further comprising an additional step:
(d) recording the time a match is lost.

17. The method of claim 16 wherein the recording of step (d) occurs only after a match is lost for more than a predetermined time.

18. The method of claim 16 wherein step (c) further comprises recording a frequency at which a match is found.

19. The method of claim 18 further comprising an additional step:
(e) transmitting the times and broadcast frequencies recorded in the monitor to a central collecting station.

20. The method of claim 19 wherein step (e) further comprises transmitting the dates recorded in the monitor to the central collecting station.

21. The method of claim 18 further comprising an additional step:
(f) erasing the times and frequencies recorded in the monitor.

22. The method of claim 1 further comprising electronically sensing an internal power supply level and discontinuing steps (a) through (c) when the power supply level sensed falls below a predetermined value.

23. The method of claim 22 wherein the electronic monitor retains times and frequencies recorded when the power supply level falls below the predetermined value.

24. The method of claim 23 further comprising recording the occurrence of the internal power supply falling below the predetermined level.

25. The method of claim 24 further comprising recording the occurrence of the internal power supply rising above the predetermined level.

26. The method of claim 25 further comprising checking the set of stored frequencies and the running check-sum and an internal time-of-day clock for valid values.

27. The method of claim 26 further comprising establishing communication with a central station and restoring a correct set of stored frequencies and valid value for the internal time-of-day clock in the event that an invalid value is discovered by the checking.

28. The method of claim 27 wherein the communication with the central station is established daily.

29. Apparatus for automatically monitoring broadcast band listening habits comprising:
(a) a portable self-powered electronic monitor, said monitor comprising:
(i) sensor means for sensing energy in the audio frequency spectrum and providing an output representative thereof,
(ii) first signal conversion means connected to said sensor means output for providing a first electronic signal representative thereof;
(iii) electronic tuner means for receiving a selectable broadcast band signal free of an injected identification signal and for providing a second electronic signal representative thereof;
(iv) autocorrelation means for autocorrelating said first and second eletronic signals and for providing first and second sets of correlation coefficients respectively indicative thereof; and
(v) control means connected to said tuner means for controlling the tuning of said tuner means by changing the tuning of said tuner means and comparison means for comparing said first with said second set of correlation coefficients until a match is found between said first and second electronic signals, and recording as data a time at which said match is found.

30. The apparatus of claim 29 wherein said control means further comprises means for further recording as data a broadcast frequency at which said match is found.

31. The apparatus of claim 29 wherein said control means further comprises a real-time clock.

32. The apparatus of claim 29 wherein said sensor means comprises an input jack means for receiving a line input of broadcast band program material from an earphone jack output of a broadcast band receiver.

33. The apparatus of claim 29 wherein said sensor means comprises a microphone circuit having an audio-frequency-sensitive microphone.

34. The apparatus of claim 33 wherein said microphone circuit further comprises an automatic level control circuit means for compressing the dynamic range of the output of said microphone circuit.

35. The apparatus of claim 29 wherein the first signal conversion means further comprises a digitizer means for converting said first electronic signal into a digital format.

36. The apparatus of claim 35 wherein said digitizer means further comprises means for converting said second electronic signal into a digital format.

37. The apparatus of claim 29 wherein said monitor further comprises:
(v) digital signal processing means receiving said first and second electronic signals for comparing said first and second electronic signals to determine whether a match is present between said first and second electronic signals.

38. The apparatus of claim 37 wherein said digital signal processing means calculates at least one correlation coefficient corresponding to the degree of correlation between said first and second electronic signals.

39. The apparatus of claim 38 wherein said digital signal processing means periodically computes said correlation coefficient.

40. The apparatus of claim 38 wherein said digital signal processing means calculates a plurality of correlation coefficients.

41. The apparatus of claim 29 wherein said control means is responsive to said first electronic signal to hold the monitor in a low power consumption state while said first electronic signal is below a threshold level.

42. The apparatus of claim 41 wherein said control means is further responsive to said second electronic signal to hold the monitor in a low power consumption state while said second electronic signal is below a threshold level.

43. The apparatus of claim 29 further comprising:
(b) a base unit for said electronic monitor, said base unit comprising
  (i) means for physically receiving said monitor on said base unit, and
  (ii) means for communicating information to and from said monitor through said base unit when said monitor is received on said base unit.

44. The apparatus of claim 43 wherein said means for communicating information further comprises a telephone interface for transmitting said recorded data to a central data collection station via a telephone connection.

45. The apparatus of claim 43 wherein said monitor further comprises a rechargeable battery and said base unit further comprises:
  (iii) electrical power connection means for recharging said battery.

46. A method of monitoring and logging broadcast audience signal reception by a receiver comprising:
(a) electronically monitoring an audio frequency spectrum for a reception by a broadcast audience member of a broadcast signal free of an injected identification signal;
(b) electronically setting a tuner in the electronic monitor successively to broadcast signal radio frequencies each modulated by a respective audio signal;
(c) electronically autocorrelating each of the audio signals of steps (a) and (b) to obtain correlation coefficients respectively indicative thereof;
(d) comparing the respective correlation coefficients until a match is found; and
(e) electronically logging as recorded data in the monitor a date, time-of-day, and radio frequency at which a match is found.

47. The method of claim 46 wherein step (a) is performed by a microphone circuit.

48. The method of claim 46 wherein step (a) is performed by an audio amplifier circuit directly receiving the audio signal at a headphone jack.

49. The method of claim 46 wherein said electronic monitor is portable and has an internal rechargeable power supply.

50. The method of claim 49 further comprising periodically coupling the portable monitor to a base unit for recharging the internal power supply of the portable monitor.

51. The method of claim 50 further comprising communicating the recorded data to a central data collection station through the base unit when the portable monitor is coupled to the base unit.

52. The method of claim 46 wherein step (c) further comprises digitizing the audio signals of steps (a) and (b) and comparing the digitized signals.

53. The method of claim 52 wherein the digitized signals are concurrently compared.

54. The method of claim 52 wherein the signals are alternately digitized and compared.

55. The method of claim 52 wherein the digitized signals are compared by electronically computing correlation coefficients.

56. The method of claim 46 wherein step (c) comprises comparing spectrograms formed as a result of steps (a) and (b).

57. The method of claim 46 wherein step (c) comprises comparing templates formed as a result of steps (a) and (b).

58. The method of claim 46 wherein steps (a) and (b) each further comprise auto correlating each signal before comparing them in step (c).

* * * * *